US012697871B2

(12) United States Patent
Falls et al.

(10) Patent No.: US 12,697,871 B2
(45) Date of Patent: Aug. 4, 2026

(54) ELECTRIC AXLE SYSTEM WITH DIFFERENT GEAR RATIOS

(71) Applicant: Flyer Next, LLC, Los Angeles, CA (US)

(72) Inventors: Bruce Falls, Dove Canyon, CA (US); Oded Nechushtan, Marina Del Rey, CA (US)

(73) Assignee: Flyer Next, LLC, Los Angeles, CA (US)

( * ) Notice: Subject to any disclaimer, the term of this patent is extended or adjusted under 35 U.S.C. 154(b) by 430 days.

(21) Appl. No.: 18/346,660

(22) Filed: Jul. 3, 2023

(65) Prior Publication Data

US 2025/0010709 A1    Jan. 9, 2025

(51) Int. Cl.
B60K 17/356 (2006.01)
B60K 17/354 (2006.01)
B60L 15/20 (2006.01)

(52) U.S. Cl.
CPC .......... B60K 17/356 (2013.01); B60K 17/354 (2013.01)

(58) Field of Classification Search
CPC .... B60K 17/356; B60K 17/354; B60K 6/448; B60K 6/52; B60K 6/547; B60L 15/20; F16H 3/089
See application file for complete search history.

(56) References Cited

U.S. PATENT DOCUMENTS

| | | | |
|---|---|---|---|
| 7,632,202 B2 | 12/2009 | Supina et al. | |
| 10,807,466 B1 | 10/2020 | Haka et al. | |
| 11,441,644 B2 | 9/2022 | Ghatti et al. | |
| 11,460,096 B2 | 10/2022 | Ziech | |
| 2008/0026898 A1* | 1/2008 | Supina .................. | B60W 20/30 |
| | | | 475/5 |
| 2016/0347159 A1* | 12/2016 | Perlo .................... | B60K 17/348 |
| 2021/0252977 A1* | 8/2021 | Engerman ............... | B60K 1/00 |
| 2021/0347257 A1* | 11/2021 | Zalewski ............... | B60K 23/04 |
| 2022/0258604 A1* | 8/2022 | Mastroianni .......... | B60W 10/06 |
| 2023/0011463 A1* | 1/2023 | Brolles .................... | B60K 1/00 |
| 2023/0234664 A1* | 7/2023 | Hu ........................... | B62J 43/28 |
| 2024/0399886 A1* | 12/2024 | McCay ............... | B60L 15/2063 |

FOREIGN PATENT DOCUMENTS

| | | |
|---|---|---|
| CN | 113236767 A | 8/2021 |
| DE | 102010020676 A1 | 11/2011 |
| DE | 102016014732 A1 | 6/2018 |

(Continued)

OTHER PUBLICATIONS

International Search Report and Written Opinion for International Application No. PCT/US2024/035586, International Searching Authority, mailed on Oct. 23, 2024, 39 pages.

(Continued)

*Primary Examiner* — Tan Q Nguyen

(74) *Attorney, Agent, or Firm* — Sterne, Kessler, Goldstein & Fox P.L.L.C.

(57) ABSTRACT

The electric axle (e-axle) system having variable gear ratios is disclosed. The e-axle system can include a first axle assembly having one axle gear ratio and a second axle assembly having two or more axle gear ratios that are selectively and independently controlled. In addition, each of the first and second axle assemblies is independently controlled to be in a neutral position.

23 Claims, 6 Drawing Sheets

(56)         References Cited

FOREIGN PATENT DOCUMENTS

| | | | |
|---|---|---|---|
| DE | 102022211979 | A1 | 5/2024 |
| JP | 2011067018 | A | 3/2011 |
| WO | 2021052557 | A1 | 3/2021 |

OTHER PUBLICATIONS

Anonymous: "Der Antrieb: Performance pur—Porsche Newsroom DEU", Sep. 4, 2019 (Sep. 4, 2019), pp. 1-14, XP093211970, Stuttgart, Retrieved from: https://newsroom.porsche.com/de/produkte/taycan/antrieb-18543.html.
De Pinto Stefano et al: "On the Comparison of 2- and 4-Wheel-Drive Electric Vehicle Layouts with Central Motors and Single- and 2-Speed Transmission Systems", Energies, Jun. 30, 2020 (Jun. 30, 2020), p. 3328, XP093212029, CH, ISSN: 1996-1073, DOI: 10.3390/en13133328.

* cited by examiner

300B

302

310

340

400

Receive data from one or more sensors — 402

Control locking mechanism to disengage one of two output gears — 404

Reduce input speed by first gear ratio — 406

408 — Reduce input speed by second gear ratio

ELECTRIC AXLE SYSTEM WITH DIFFERENT GEAR RATIOS

TECHNICAL FIELD

The disclosure relates to the field of electric vehicles.

BACKGROUND

As vehicles have come to incorporate electrical technologies to enhance the functionality of vehicle components, axle assemblies having an electric motor (i.e., electric axles) have been increasing in popularity. Such an electric axle or e-axle combines an electric motor and a gear mechanism (e.g., reducer and differential), and generates a rotating torque using electricity. A vehicle axle, whether a conventional axle rotating by an engine or e-axle rotating by a motor, is a central shaft for rotating wheels or gears, and a vehicle generally includes one or more driven axles. For instance, passenger cars (e.g., sedan, SUV, minivan, etc.) have front and rear axles to rotate front and rear wheels, respectively, while larger vehicles (e.g., commercial buses, trucks, trailers, etc.) that carry more passengers/loads and have more wheels may have more than two axles.

E-axles are widely used in vehicles utilizing hybrid/ electric power. Vehicles having e-axles generally have one single predetermined gear ratio (i.e., single speed) for all the axles (e.g., front and rear axles). That is, one same ratio is selected for both front and rear e-axles in a vehicle.

An axle ratio or axle gear ratio is a manufacturer-defined value selected according to the vehicle's specific body style and power source in order to meet specific performance metrics, such as towing strength, efficiency, etc. For example, a higher axle ratio is desirable for quick starts with high torque to begin moving a vehicle, but is undesirable for operation at higher speeds. While the higher axle ratio provides more pulling power, it generally results in a reduction in fuel economy. A lower axle ratio is desirable for high-speed operation, but is undesirable and may be inadequate to initiate vehicle motion. A compromise axle ratio may be selected, but this is only efficient at mid-range speeds. In addition, the compromise gear ratio (e.g., mid-range value) is less efficient at different operating points because the gear ratio is not matched to the operating speed.

In general, vehicles utilizing e-axles do not have a neutral position to disengage the electric motor and/or output gears from the wheels. However, a neutral position is beneficial in certain situations, such as towing, etc.

Thus, it would be desirable to have a multi-ratio drive that would overcome the above disadvantages particularly for all-wheel drive (AWD) vehicles, which independently power the front and rear wheels all the time to provide traction effort. This could be accomplished with multi-ratio e-axles for both the front and the rear drive but this adds mass and cost as a multi-ratio e-axle is more complex multi-ratio.

One solution that can provide the advantages without incurring the additional mass/cost is to use one multi-ratio e-axle and one single speed e-axle with neutral capabilities. The single speed e-axle can have a different gear ratio than the multi-ratio e-axle to allow for increased operating performance in many instances. In addition, it would be advantageous to develop a dual- or multi-axle system that is lightweight, reduces windage and frictional losses, can be operated in a low speed and high torque manner of operation and a high speed and low torque manner of operation, and that can be reconfigured for desired gear ratios without excessively increasing a cost of the drive axle system. Further, a neutral function capability for both front and rear wheels can bring several advantages such as increased efficiency and reduced failure mode consequences. The multi-ratio allows optimizing motor working points in a relatively large range for increased performance and efficiency for both positive and negative torques (e.g., propulsion and regeneration).

Therefore, improved multi-ratio e-axle systems are needed to overcome one or more of the aforementioned shortcomings.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

Figure 1:
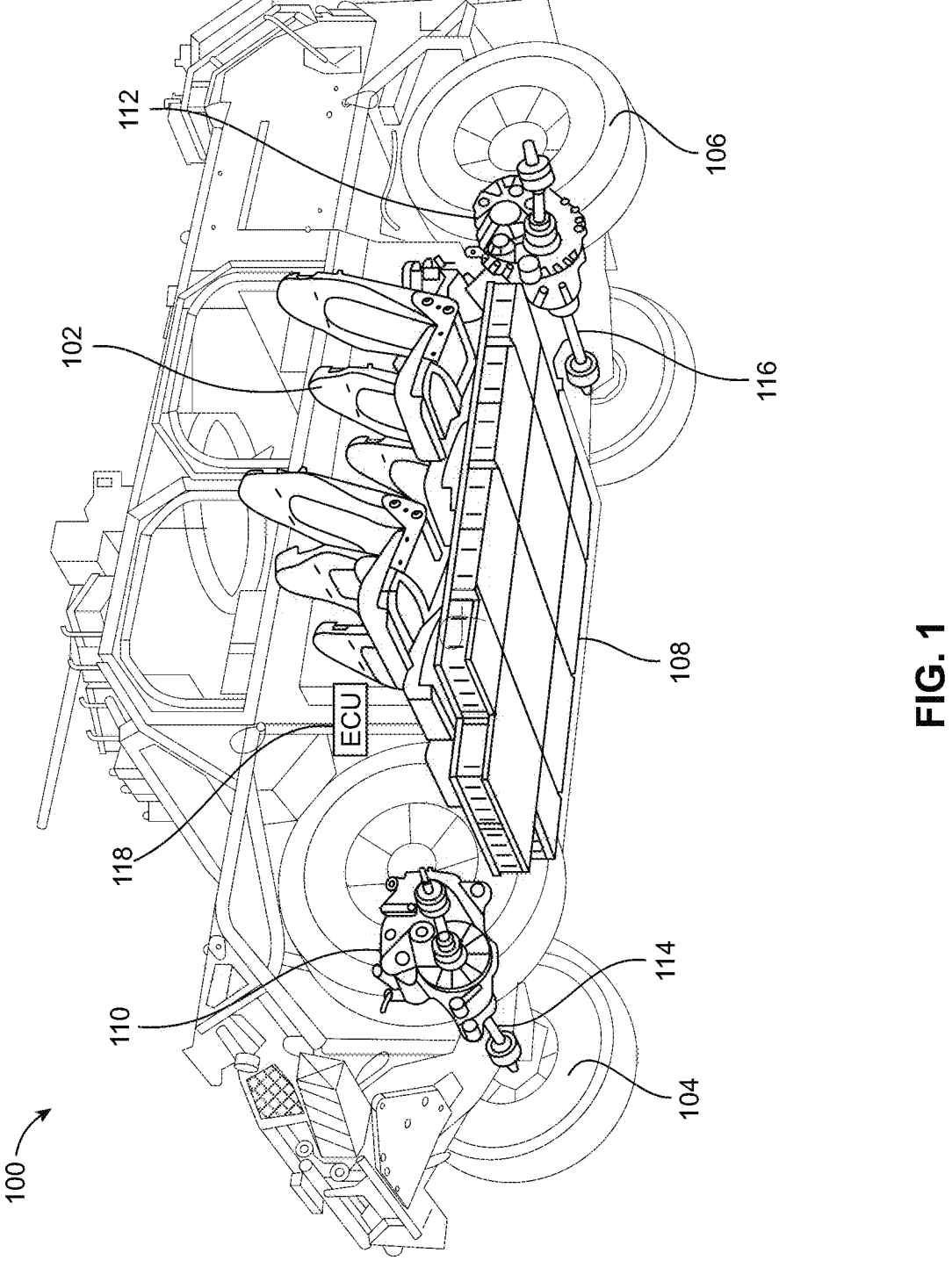
FIG. 1 shows a vehicle having an electric axle system according to aspects of the disclosure.

Before the present disclosure is described, it is to be understood that this disclosure is not limited to particular aspects described, as such may, of course, vary. It is also to be understood that the terminology used herein is for the purpose of describing particular aspects only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the present disclosure, some potential and preferred methods and materials are now described. All publications mentioned herein are incorporated by reference to disclose and describe the methods and/or materials in connection with which the publications are cited. It is understood that the present disclosure supersedes any disclosure of an incorporated publication to the extent there is a contradiction.

DETAILED DESCRIPTION

Aspects disclosed herein provide a novel electric axle (e-axle) system. The system provides a novel architecture over conventional systems as will be described. This architecture may provide several benefits.

The e-axle system allows a vehicle to have multiple axle gear ratios. By employing an e-axle system with different gear ratios, a vehicle may have better launch performance using lower gears, more efficient high-speed driving using higher gears, and achieve increased speeds without limiting acceleration.

In addition, the e-axle system can be operated in a low speed and high torque manner of operation and a high speed and low torque manner of operation as an improved torque/ speed combination with a relatively simple reconfiguration of the existing axle assembly.

Further, the e-axle system can be in a neutral position for each axle independently, which provides options for failure mitigation while increasing vehicle efficiency. Since each axle can be independently controlled to be in the neutral position, there is no need to lock the axles to be in a single speed, which enables freedom of operation. Accordingly, each axle can be independently controlled, regardless of a neutral position of an axle, thus increasing operating efficiency of the vehicle in any road condition.

The e-axle system as described hereinafter is designed to employ an e-axle having a multi-ratio (e.g., multi-speed) and another e-axle having a single ratio (e.g., single speed), each having neutral capabilities, without an increase in vehicle mass and cost.

The e-axle system may be employed in various vehicles, electric or non-electric vehicles, passenger vehicles, buses, all-terrain vehicles, or the like. In particular, the multi-ratio e-axle system having independently controlled axles with neutral capability is beneficial for all-terrain vehicles (e.g., a military vehicle) operated by an electric motor for vehicle operation optimization allowing high mobility in extreme situations (e.g., uneven road grade, etc.).

In aspects, an axle system for an electric vehicle (EV) includes a first axle assembly configured to operate in a first gear ratio; and a second axle assembly configured to selectively operate in a second gear ratio and a third gear ratio. The first gear ratio, the second gear ratio, and the third gear ratio may be different ratios. The first axle assembly and the second axle assembly may be configured to operate independently of each other.

In aspects, a vehicle includes: a first axle assembly configured to operate in a first gear ratio; a second axle assembly configured to selectively operate in a second gear ratio and a third gear ratio; and a computing system configured to: control the first axle assembly and the second axle assembly, and dynamically select between the second gear ratio and the third gear ratio. The first gear ratio, the second gear ratio, and the third gear ratio may be different ratios. The first axle assembly and the second axle assembly may be configured to operate independently of each other.

In aspects, a computing system includes: a memory storing instructions; and one or more processors, coupled to the memory, and configured to dynamically select a first gear ratio and a second gear ratio of a first axle assembly of a vehicle. A second axle assembly of the vehicle may have a third gear ratio. The first gear ratio, the second gear ratio, and the third gear ratio may be different ratios, and the one or more processors may be further configured to control the first axle assembly and the second axle assembly independently of each other.

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of the disclosure. However, it will be apparent that the disclosure may be practiced without these specific details. In order to avoid obscuring aspects of the present disclosure, some configurations and process steps are not disclosed in detail.

The drawings showing aspects of the system and its components are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "vehicle" refers to, but is not limited to, cars, trucks, vans, trains, autonomous vehicle, aircraft, aerial drones, and the like. Further, the term "vehicle" includes electric vehicles, fuel cell vehicles, and the like, and further refers to front-wheel drive vehicles, rear-wheel drive vehicles, all-wheel drive vehicles, four-wheel drive vehicles, and the like.

Electric Vehicle

FIG. 1 shows a vehicle 100 having a dual electric axle (e-axle) system installed thereto. In aspects, the vehicle 100 may be all-wheel drive (AWD) and may be a light utility vehicle having vehicle seats 102 and a pair of front and rear wheels 104, 106. In aspects, the vehicle 100 may be an electric vehicle operated by an electric motor(s) and batteries. For example, the vehicle 100 includes a battery pack 108 comprising battery cells for operating one or more motors. Additional detailed descriptions on the battery pack and system that can be used are provided in U.S. application Ser. No. 18/081,344 filed Oct. 14, 2022 entitled "CONFIGURABLE VEHICLE BATTERY BACKPLANE AND MODULES AND METHODS OF OPERATING THE SAME," which is incorporated herein in its entirety by reference.

Instead of batteries, other electrical storage devices that can store electrical power and dispense electrical power that can be used without altering the concepts of the present disclosure. In certain aspects, the battery pack 108 of battery cells can communicate with an electrical control unit (ECU) 118 and provides an electrical power, which then can be converted, to a mechanical power by the electric motor(s). In certain aspects, the battery cells may be charged when the wheels are retarded in response to electrical control of the ECU 118 by rotation of the electric motor(s). That is, the battery cells may be rechargeable, electrochemical energy storage devices in electrical communication with the electric motor. It is understood that the battery pack 108 may also be in electrical communication with other components of the vehicle to supply power thereto.

The vehicle 100 may further include various sensing devices communicating with the electric motor(s), wheels, and the ECU 118 to detect driving conditions, such as a vehicle speed, acceleration, accelerator pedal position, road gradient, road surface, a battery status, a motor speed, etc.

In aspects, the vehicle 100 includes a front e-axle assembly 110 for the front wheels 104 and a rear e-axle assembly 112 for the rear wheels 106. The e-axle assemblies may be arranged in a parallel configuration as shown in FIG. 1. That is, the front e-axle assembly 110, particularly, a front axle electric motor is arranged in parallel with a pair of front axle shaft 114, and similarly, a rear axle electric motor of the rear e-axle assembly 112 is connected in parallel with a pair of rear axle shaft 116.

As noted above, each front and rear e-axle assembly 110, 112 includes one or more electric motors, which provide an input power/speed to respective axle assembly. The e-axle assemblies 110, 112 include gear mechanism therein configured to increase torque and reduce output speed to the wheel. For instance, the input speed of each motor is reduced by a predefined gear or axle ratio of input and output gears such that the pair of front and rear wheels 104, 106 respectively connected to the front and rear e-axle assemblies 110, 112 rotate with the reduced speeds. In aspects, the gear ratios of the front and rear e-axle assemblies 110, 112 may be different from each other. In this case, the front and rear electric motors are operated at different speeds to allow the front and rear wheels to match speed.

In addition, one of the two axle assemblies, e.g., the rear e-axle assembly 112, may have more than one gear ratio. Thus, with the vehicle 100 having such a dual e-axle system according to aspects, where front and rear axle assemblies have a different gear mechanism, it is possible to change speed and torque and efficiently provide a smooth ride even when the road conditions (gradient of hill, road surface, etc.) change.

In aspects, the front and rear e-axle assemblies 110, 112 may each have a neutral capability (e.g., true neutral), which is independently controlled, thus providing the ability to free-spin the front and rear e-axles, which can increase efficiency under certain load conditions. This feature also provides an advantage for towing and failure mode mitigation.

FIG. 1 illustrates a military vehicle as an example; however, any electric vehicle (sedan, truck, bus, etc.) can be operated by the e-axle system assemblies. In addition, the vehicle 100 described herein is not limited to an electric vehicle, but a vehicle operated by, e.g., both an engine and a motor (hybrid), or fuel cell, can be equipped with the dual e-axle system. Hereinafter, each e-axle assembly will be described in detail.

First Electric Axle Assembly

Figure 2:
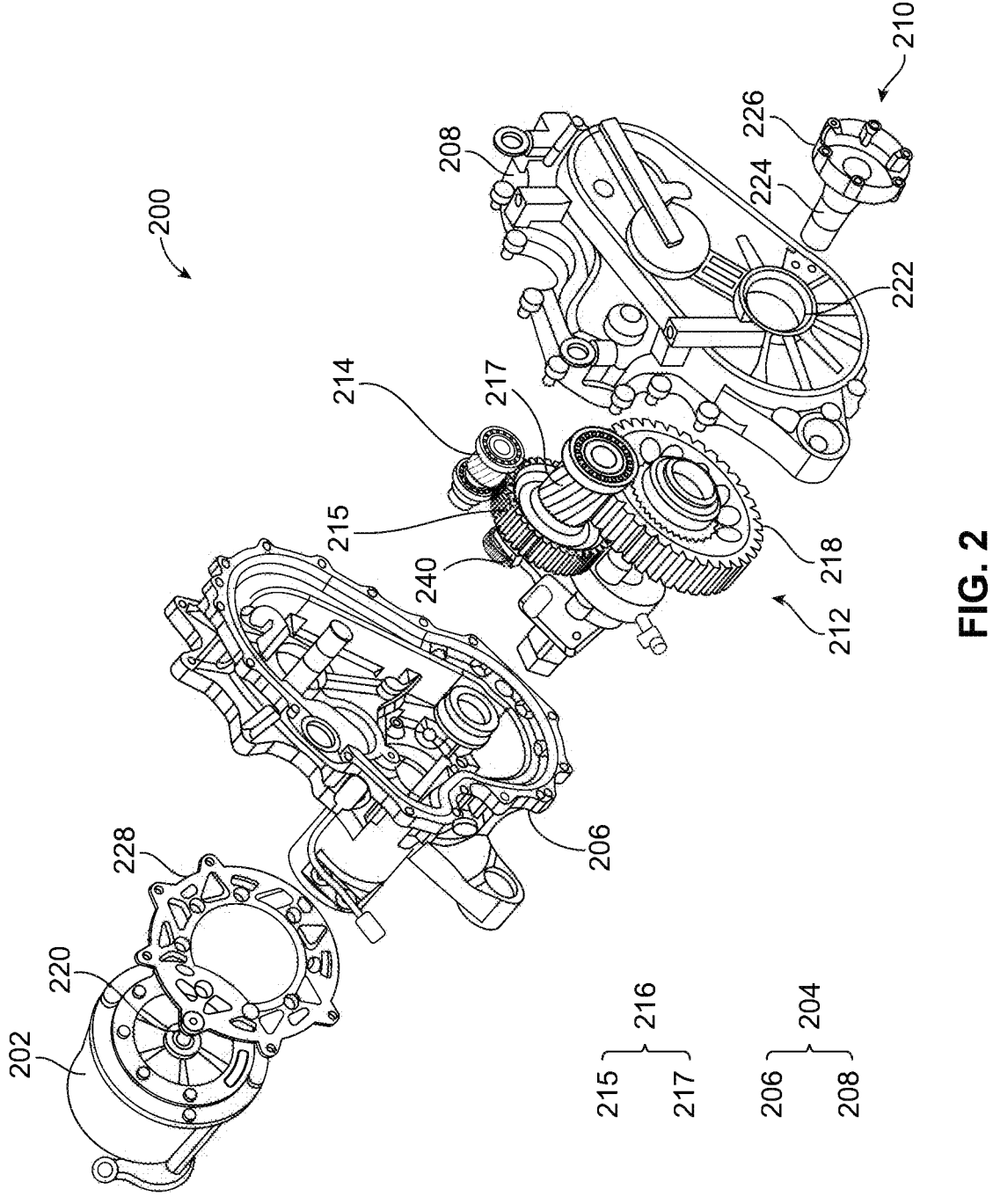
FIG. 2 shows an exploded view of a front electric axle assembly according to aspects of the disclosure.

FIG. 2 shows an exploded view of an electric axle assembly 200 according to aspects of the disclosure. The e-axle assembly 200, e.g., front e-axle assembly, includes an electric motor 202 connected to one end of a gear housing 204. The electric motor 202 may be positioned at an outer side of the gear housing 204 and extending away therefrom. In some aspects, the electric motor 202 may be aligned in parallel with a vehicle axle. However, it is not limited to the parallel arrangement, but the electric motor 202 may be aligned to be perpendicular to an axle shaft (e.g. front axle shaft 114 of FIG. 1). In addition, the electric motor 202 provides a rotational torque (e.g., input speed or driver's speed) to the axle assembly 200, which is then transferred to the wheels (e.g., front wheels 104 in FIG. 1).

The gear housing 204, to which the electric motor 202 is connected, is a casing to protect gear mechanism from foreign materials therein while allowing connections between the axle components, e.g., axle shafts, a power source (e.g., motor), etc. In aspects, the gear housing 204 may be a rear casing 206 and a front casing 208 assembled together. The electric motor 202 may be secured to the gear housing 204 by an adapter plate 228.

In some aspects, the front casing 208 may have an opening 222 through which a vehicle axle can pass or coupled thereto in the parallel arrangement. The vehicle axle may be one shaft having a cylindrical rod shape or a pair of half shafts coupled to right and left side of the gear housing 204. In aspects, the vehicle axles are coaxially aligned with the electrical motor 202, in a parallel arrangement. Additionally or optionally, a connector 210 (e.g., mating flange) may be provided to be partially fitted in the opening 222 to aid the coupling of the vehicle axle to the gear housing 204.

In aspects, gear mechanism 212 may be housed in the gear housing 204 as a combination of a differential gear and a reduction gear that allow speed reduction between an input speed and an output speed. As will be described below, each gear in the gear mechanism 212 has a predetermined number of teeth to achieve a desired gear ratio. Each gear of the gear mechanism 212 may have a bearing coupled to an end to reduce friction therebetween.

The gear mechanism 212 may include a drive gear 214, a reduction gear 216, and a differential or output gear 218. In aspects, the drive gear 214 is coupled with a drive shaft 220 of the electric motor 202 such that the drive gear 214 rotates at the same speed of the electric motor 202. The drive gear 214 is gear-meshed with the reduction gear 216, which may include a first reduction helical gear 215 engaged with the drive gear 214 and a second reduction helical gear 217 having a smaller diameter than and extending from the first reduction helical gear 215 away from the motor 202 and engaged with the output gear 218. Alternatively, the reduction gear 216 may have only one set of gear engaged with the driver gear 214 and the output gear 218. The engagement between the drive gear 214 and the reduction gear 216 (e.g., the first reduction helical gear 215) can be selectively unlocked to provide a neutral capability, which will be described in detail later in this description.

In aspects, the output gear 218 has a greater diameter and also greater number of gear teeth than those of the drive gear 214 and the reduction gear 216 (both the first and second reduction helical gears 215, 217). Accordingly, although the gears are directly or indirectly engaged to each other, it takes longer for the output gear 218 to complete the full turn relative to the other gears. The ratio of the number of gear teeth of the drive gear 214 to that of the output gear 218 defines a gear axle ratio or speed. Such a gear ratio can be tuned by simply changing the number of gear teeth of the respective gear (e.g., output gear 218). A relatively larger number of gear teeth of the output gear 218 results in a relatively more reduced rotational speed of the axle engaged with the output gear 218, thereby reducing the wheel speed.

In aspects, the output gear 218 has a predetermined number of teeth to be different from that of the drive gear 214 to define an input/output gear axle ratio. As an example, if the drive gear 214 has 10 (ten) gear teeth while the output gear 218 has 260 (two hundred sixty) gear teeth, the axle ratio (or speed) becomes 26:1 or simply 26. This is merely an example such that the number can be varied based on various considerations. The number of gear teeth, which determines axle ratio or wheel speed can be determined by a manufacturer based on the vehicle specifications and use of the vehicle. In certain aspects, the axle ratio may be reconfigured by simply changing or replacing the gear (e.g., output gear 218) to have a different number of gear teeth.

In aspects, the e-axle assembly 200 may have a single-speed configuration determined based on the drive gear 214 to output gear 218 gear teeth ratio. An electric axle system with a single speed is known to those skilled in the art and the detailed functional and structural description are omitted herein.

In addition, the e-axle assembly 200 may have a neutral capability. For instance, a neutral position refers to a situation when an initial gear (or reduction gear in aspects) is equal to 0 (zero). In aspects, for this neutral configuration, the drive gear 214 may be disengaged from the reduction gear 216 or the reduction gear 216 may be disengaged from the drive gear 214 and the output gear 218 by a shift mechanism, allowing the output gear 218 to freely rotate. In some aspects, this is accomplished by a clutch (e.g., dog clutch) that mechanically engages a gear to an input shaft or lets a gear to free spin. For instance, a shift mechanism 240, e.g., a dog clutch, may be selectively coupled to the reduction gear 216, such that the reduction gear 216 does not rotate when the dog clutch 240 is engaged. Alternatively, a clutch may be coupled between the drive gear 214 and the motor shaft 220. In some aspects, a neutral switch may be provided to allow the power disconnection between the electric motor 202 and the wheels. In further aspects, the neutral configuration may be entered into based on vehicle and road conditions (e.g., battery status, stop of vehicle, etc.). Additionally or optionally, the electric motor 202 may be disconnected from a vehicle controller or battery pack. The wheels can rotate freely as a result. In aspects, the neutral configuration can be manually selected by a user, for example, pressing a neutral gear button or the like.

The e-axle assembly 200 according to aspects of the present disclosure may communicate with an electronic control unit (ECU) (see "118" FIG. 1). The ECU can communicate with the electric motor 202 and the gear mechanism 212 as well as various electronic devices/sensors installed in the vehicle. For instance, the sensors (not shown) on the vehicle include, but are not limited to sensors, which provide continuous sensor outputs to the ECU, including wheel speed sensors, an ambient temperature sensor, an atmospheric pressure sensor, tire pressure sensors, yaw sensors to detect yaw, roll and pitch of the vehicle, a vehicle speed sensor, a longitudinal acceleration sensor, a torque sensor (or e-torque estimator), a steering angle sensor, a gradient sensor (or gradient estimator), a lateral acceleration sensor (part of a stability control system (SCS)), a brake pedal position sensor, an accelerator pedal position sensor and longitudinal, lateral, and vertical motion sensors. Such sensor detection in a vehicle technology is familiar to a person of skill in the art, and thus, the detailed description is omitted. In aspects, based on the data obtained by various sensors, the ECU can control the speed of the motor 202.

Second Electric Axle Assembly

Figure 3A:
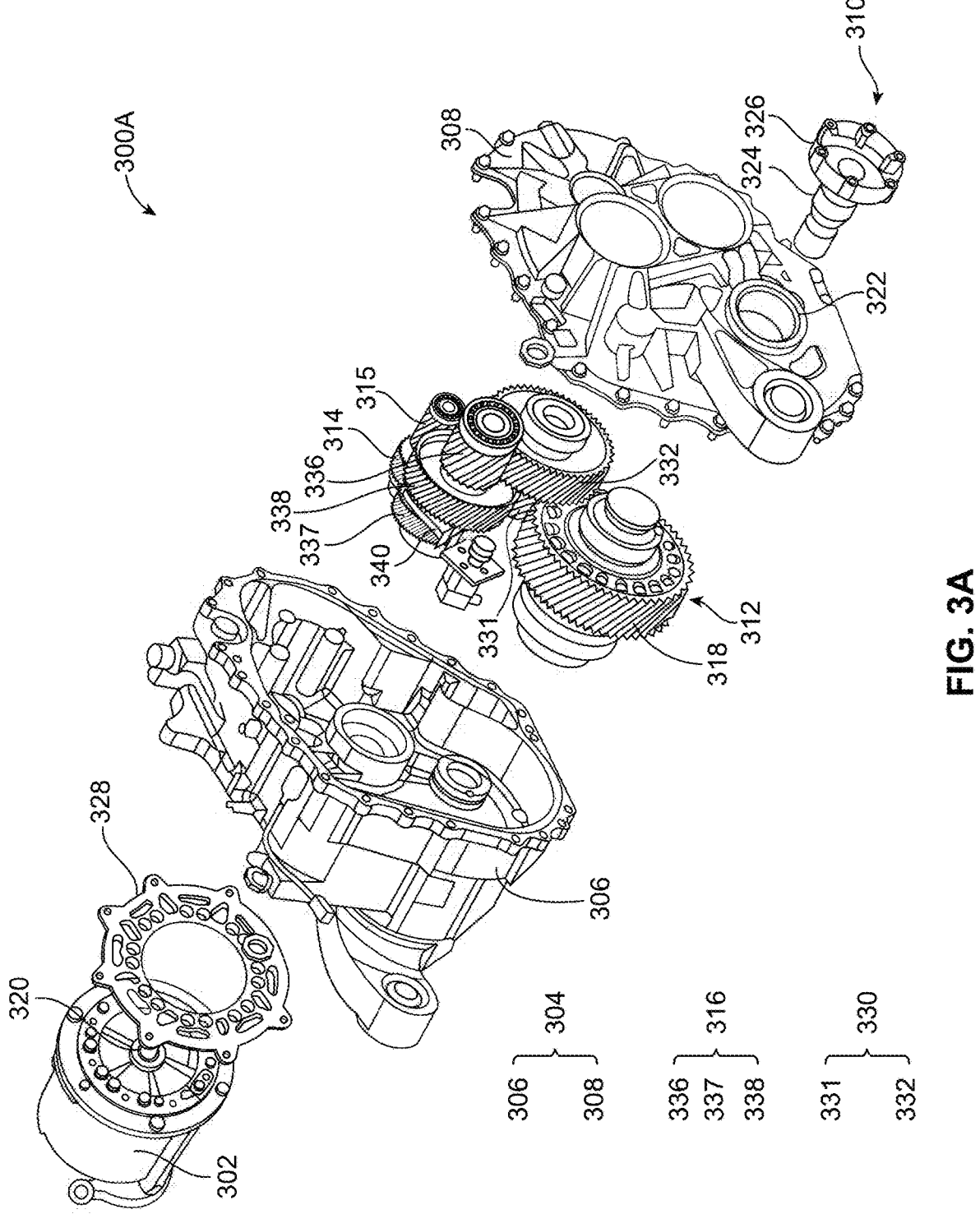
FIG. 3A shows an exploded view of a rear electric axle assembly according to aspects of the disclosure.
Figure 3B:
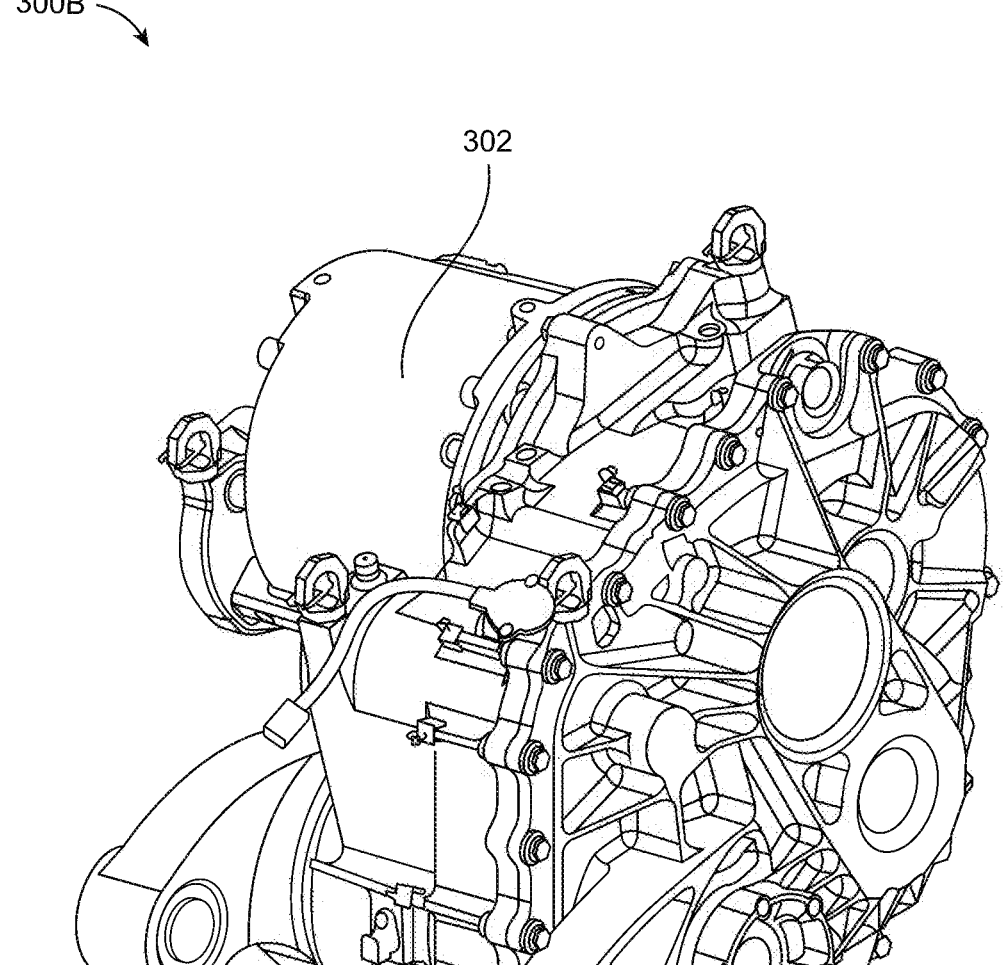
FIG. 3B shows an assembled view of the rear electric axle assembly according to aspects of the disclosure.

FIG. 3A shows an exploded view of another electric axle assembly according to aspects of the disclosure, and FIG. 3B shows an assembled view of the electric axle assembly of FIG. 3A. In particular, e-axle assemblies 300A and 300B of FIGS. 3A and 3B, respectively, may depict a second axle assembly for, e.g., rear wheels. The configurations of the e-axle assemblies 300A and 300B are similar to those of the front e-axle assembly 200 of FIG. 2. However, the e-axle assemblies 300A and 300B may include an additional gear set that can provide for additional gear ratios. That is, the e-axle assemblies 300A and 300B may be reconfigurable assemblies to achieve the novel technology of dual axle system having two or more axle ratios, independent from the e-axle assembly 200 (e.g., front axle assembly).

Referring to FIG. 3A, the e-axle assembly or rear e-axle assembly 300A includes an electric motor 302 and a gear housing 304 composed of two casings, a rear casing 306 and a front casing 308, configured to be assembled to each other. The electric motor 302 may be secured to the gear housing 304 by an adapter plate 328. The number of casings forming the gear housing 304 could be three or more similar to the gear housing 204 of assembly 200. The front casing 308 may be a lid for covering the rear casing 306 having an internal space in which a differential can be positioned. An outer surface of the front casing 308 may have the shape corresponding to the gears therein while reducing the size of the overall axle assembly 300A. Thus, the shape of the gear housing 304 may be slightly different from that of the gear housing 204 to accommodate more gears therein. Additionally or optionally, a connector 310 may be provided to be partially fitted in an opening 322 of the front casing 308 to aid the coupling of the vehicle axle to the gear housing 304.

In aspects, the gear housing 304 of FIG. 3A may include a gear mechanism 312 engaged with the electric motor 302 for receiving and reducing an input speed. The electric motor 302 includes a drive shaft 320 having a first end coupled thereto and a second end extending to the gear housing 304. The drive shaft 320 extended inside the gear housing 304 is engaged with a gear mechanism 312 of the e-axle assembly 300A. In aspects, the gear mechanism 312 includes an input gear (e.g., drive gear) that is coupled with the second end of the drive shaft 320 thus rotating at a speed of the electric motor 302. Similar to the axle assembly 200 of FIG. 2, the gear mechanism 312 further includes a differential gear (e.g., output gear 318) indirectly engaged with the drive gear. In aspects, an axle shaft (see FIG. 1) may pass through the opening 322 formed and tightly coupled with the output gear 318 by the connector 310. Thus, the axle shaft can rotate at the same speed as the output gear 318. The configurations of the axle shaft connection of the e-axle assembly 300 are similar to those of the e-axle assembly 200 of FIG. 2, and therefore, the detailed description is omitted.

In aspects, the drive gear may be a first input helical gear 314 rotating with the rotation of the electric motor 302, and has a predetermined number of gear teeth. The number of gear teeth of the first input helical gear 314 may be the same as or different from that of the drive gear 214 of the front e-axle assembly c. The drive gear of the rear e-axle assembly 300A may further include a second input helical gear 315 having a diameter smaller than and extending from the first input helical gear 314 away from the motor 302.

In aspects, the gear mechanism 312 may further include a first reduction gear 316 and a second reduction gear 330. The first reduction gear 316 includes a first rear gear 337 that is gear-meshed with the first input helical gear 314 and a second rear gear 338 having a diameter greater than and extending from the first rear gear 337 to be away from the motor 302. The second rear gear 338 is gear-meshed with the second input helical gear 315. The first reduction gear 316 may further include a front gear 336 having a smaller diameter than and extending from the rear gears 337, 338 to be away from the motor 302. The first reduction gear 316 can rotate by the rotation of the drive gear, e.g., either the first input helical gear 314 or the second input helical gear 315, selectively. As will be described later, this configuration enables the rear e-axle assembly 300A to have two different gear ratios.

The second reduction gear 330 may include a rear gear 331 gear-meshed with the output gear 318, and a front gear 332 having a greater diameter than and extending from the rear gear 331 away from the motor 302. The front gear 332 of the second reduction gear 330 can be engaged with the front gear 336 of the first reduction gear 316 thereby rotating by the rotation of the first reduction gear 316. With this configuration, the output gear 318 can rotate by the second reduction gear 330 which rotates by the first reduction gear 316 selectively receiving rotation from the first input helical gear 314 and the second input helical gear 315.

As described above, the output gear 318 can be gear-meshed with the second reduction gear 330 by the rear gear 331. The second reduction gear 330 can be further gear-meshed with the first reduction gear 316 by the front gear 332 and the second input helical gear 315 being engaged.

In one aspect, the gear mechanism 312 includes a switching mechanism configured to selectively lock and unlock the first reduction gear 316 based on a desired wheel speed or gear ratio. The switching mechanism may include, e.g., a dog clutch coupled between the first rear gear 337 and the second rear gear 338 so as to be actuated by a shift collar to selectively lock and unlock the first rear gear 337 and the second rear gear 338. In some aspects, the first reduction gear 316 can selectively rotate by the first input helical gear 314 engaged with the first rear gear 337 and the second input helical gear 315 engaged with the second rear gear 338, where the first input helical gear 314 and the second input helical gear 315 have a different number of gear teeth from each other. Accordingly, it is possible to selectively, indirectly engage an input gear having different number of gear teeth (e.g., two different gears) with one output gear.

Each gear of the gear mechanism 312 has a predetermined number of teeth that are different from each other. For example, if the first input helical gear 314 has 10 (ten) gear teeth while the output gear 318 has 360 (three hundred sixty) gear teeth, the axle ratio (or speed) becomes 36:1 or simply 36. Thus, when the second rear gear 338 is in the locked state, the first rear gear 337 of the first reduction gear 316 rotates by the first input helical gear 314 which then rotates the second reduction gear 330 and the output gear 318 and the axle ratio becomes 36. On the other hand, assuming the second input helical gear 315 has 5 (five) gear teeth, the axle gear ratio becomes 72:1 or 72 when the first rear gear 337 is in the locked state by the switching mechanism. In this description, two reduction gears for two axle gear ratios have been described. However, it is not limited to two ratios, but the axle ratios can be varied by changing the number of the reduction gears and the input or drive gear design. Such that, the gear mechanism 312 may have additional gear ratio, e.g., a third gear ratio. According to various aspects, a vehicle having an e-axle system, e.g., the e-axle assemblies 200 and 300A/300B, can have one speed gear ratio for one axle (e.g., front axle) and two or more gear ratios, which can be dynamically selected, for another axle (e.g., rear axle). That is, the rear axle can have more than two gear ratios by reconfiguring the gear mechanism, e.g., adding additional reduction gear and reconfiguring the output gear. In addition, the axle ratio of each axle assembly may be different from each other, thus yielding multi axle ratio where there is no single speed. That is, each axle assembly (front and rear axles) can be independently and distinctly operated, which can increase vehicle operation particularly in any types of road conditions (e.g., rough road surface, icy/snow conditions, puddles, bumps, steep uphill, etc.).

In addition, similar to the e-axle assembly 200 of FIG. 2, the e-axle assembly 300A can have a neutral capability, which is independently controlled regardless of the gear position of the e-axle assembly 200. That is, when an initial gear or speed is equal to 0 (zero), the initial or drive gear is neutral. In this neutral configuration, the drive gear can be disengaged from the first reduction gear 316 or the first reduction gear 316 is disengaged from the second reduction gear 330 by a shift mechanism, allowing the output gear 318 to freely rotate. For example, a shift mechanism 340, e.g., a dog clutch may be provided for disengaging between the motor 302 and the drive gear. In some aspects, a neutral switch may be provided to allow the power disconnection between the electric motor 302 and the wheels. In some aspects, the neutral configuration may be entered into based on vehicle and road conditions (e.g., battery status, stop of vehicle, etc.). Additionally or optionally, the electric motor 302 may be further disconnected from vehicle control devices. The wheels can rotate freely as a result. The functions and configurations for neutral capability or position applied to the e-axle assembly 300A are similar to that for the e-axle assembly 200, and thus, further details are omitted herein.

The e-axle assembly 300A according to aspects of the present disclosure may further include an electronic control unit (ECU). The ECU can communicate with the electric motor 302 as well as various sensors installed in the vehicle. For instance, the sensors (not shown) on the vehicle include, but are not limited to, sensors which provide continuous sensor outputs to the ECU, including wheel speed sensors, an ambient temperature sensor, an atmospheric pressure sensor, tire pressure sensors, yaw sensors to detect yaw, roll and pitch of the vehicle, a vehicle speed sensor, a longitudinal acceleration sensor, a torque sensor (or torque estimator), a steering angle sensor, a gradient sensor (or gradient estimator), a lateral acceleration sensor (part of a stability control system (SCS)), a brake pedal position sensor, an accelerator pedal position sensor and longitudinal, lateral, and vertical motion sensors. In aspects, a 3-axis accelerometer may be used for detecting yaw, longitudinal acceleration, gradient, lateral acceleration, etc. Based on the various sensor signals received, the ECU can control the switching mechanism to selectively switch between the reduction gears 316, 330. Further, the ECU can control the speed of the electric motor 302 to provide the initial speed to the drive gear.

FIG. 3B illustrates an assembled view of the electric axle assembly of FIG. 3A. As shown, the rear casing 306 and the front casing 308 are assembled together to protect the gear mechanism 312. The electric motor 302 is connected to the rear casing 306 and connected to the drive gear while the axle shaft can be connected to the output gear 318 through the connector 310.

Unlike commonly used e-axle systems for electric vehicles, the e-axle system according to aspects of the present disclosure has configurations that allow front and rear axles to be independently operated at different input motor speeds. Further, even when one of the axle assemblies are in a neutral position, the other of the axle assemblies can be normally operated (e.g., running at a certain speed) or controlled to be in a neutral position.

Dual Axle System

Figure 4:
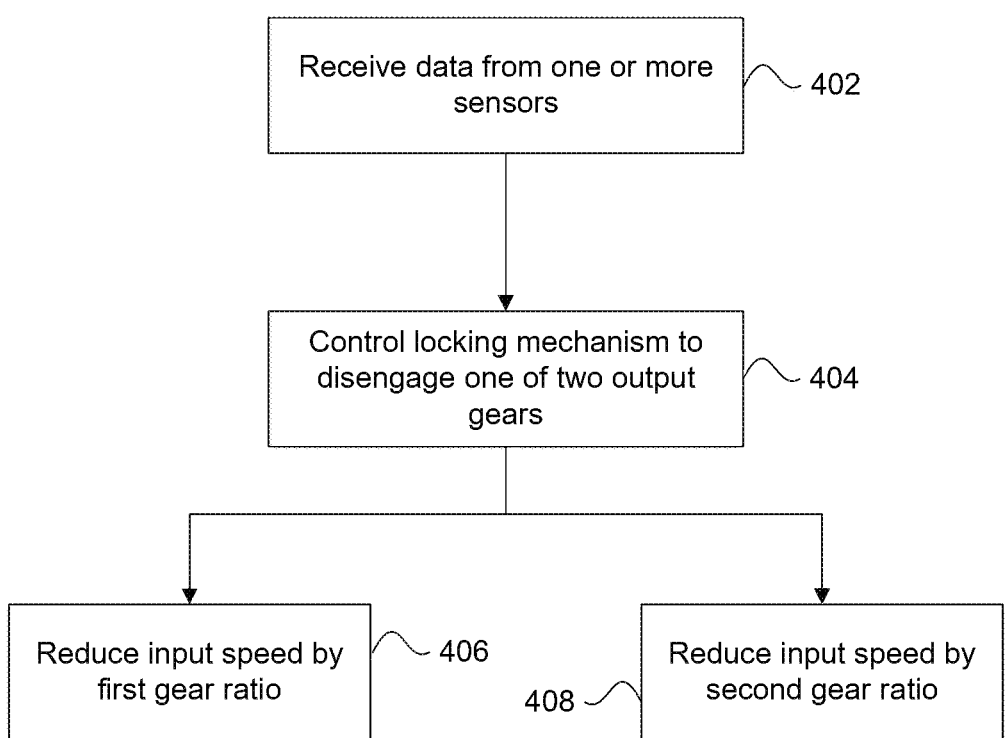
FIG. 4 shows an example method of operating the electric axle system according to aspects of the disclosure.

FIG. 4 is an example method 400 of operating the electric axle system for selecting gear ratios by integrating data collected by various sensors according to aspects of the disclosure. In particular, method 400 operates the rear e-axle assembly 300A of FIG. 3 for selectively changing gear ratios. Method 400 may be performed by one or more processors (e.g., ECU) to execute the stored instructions to implement method 400. Method 400 can comprise a series of steps.

In aspects, and as shown in step 402, the vehicle (e.g., vehicle 100 of FIG. 1) can receive data from various sensors communicating with the ECU. The sensors can include sensors, which provide continuous sensor outputs to the ECU, including wheel speed sensors, an ambient temperature sensor, an atmospheric pressure sensor, tire pressure sensors, yaw sensors to detect yaw, roll and pitch of the vehicle, a vehicle speed sensor, a longitudinal acceleration sensor, a torque sensor (or e-torque estimator), a steering angle sensor, a gradient sensor (or gradient estimator), a lateral acceleration sensor (part of a stability control system (SCS)), a brake pedal position sensor, an accelerator pedal position sensor and longitudinal, lateral, and vertical motion sensors. In aspects, the 3-axis accelerometer may be used for detecting yaw, longitudinal acceleration, gradient, lateral acceleration, etc. In aspects, the ECU receives sensor data and, in step 404, controls a locking mechanism to selectively lock or unlock the first rear gear 337 and the second rear gear 338 of the first reduction gear 316.

In step 406, when the first rear gear 337 is locked, the output gear 318 rotates by the first input helical gear 314 so that the e-axle assembly can produce a first gear ratio. On the other hand, in step 408, when the second rear gear 338 is locked, the output gear 318 rotates by the second input helical gear 315 so that the e-axle assembly can produce a second gear ratio. Based on the locking and unlocking of the first reduction gear 316, vehicle wheels, e.g., rear wheels, rotate at different speeds even as the input speed of the motor is unchanged. That is, even when a driver enters the same speed by controlling an accelerator, the wheel speeds for a set of front wheels and a set of rear wheels can vary based on the various road conditions. For example, the wheel speeds may vary depending on the differential in the front/ rear when in a cornering maneuver. In certain situations, a slip can be controlled differently between front and rear wheels.

It has been discovered that the axle system described above significantly improves the state of the art from conventional systems in that it provides a unique architecture that can be used to improve efficiency of driving of the EV. The benefit of the system over conventional systems is that it enables the electric machine to operate in a more efficient region, increases vehicle acceleration, gradeability, and top speed, and reduces overall traction system mass and volume, with simple reconfiguration. That is, by using multi-gear ratios, it is possible to provide an improved launch performance using lower gears, more efficient high-speed driving using higher gears, and achieve increased speeds without limiting acceleration. Moreover, the e-axle system described above can be driven in a neutral position independently in front and rear wheels, which provides options for failure mitigation while increasing vehicle efficiency.

Components of the System

Figure 5:
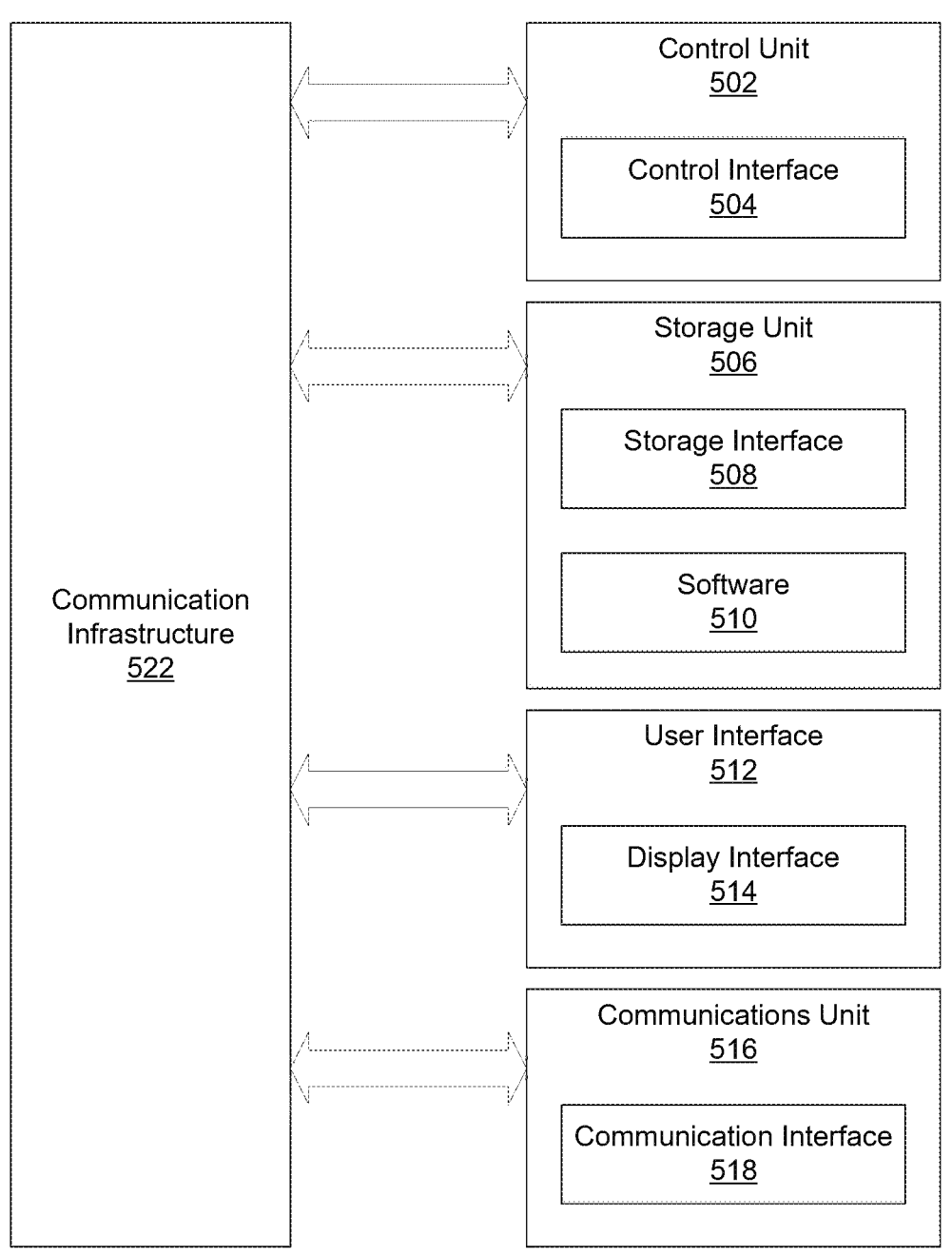
FIG. 5 shows an example computing system of the vehicle according to aspects of the disclosure.

FIG. 5 shows an example computing system 500 of the vehicle 100 according to aspects of the disclosure. In aspects, the computing system 500 can be used to control the gear ratios as described with respect to FIGS. 2-4. In aspects, the components may include a control unit 502 (e.g., ECU 118 of FIG. 1), a storage unit 506, a communication unit 516, and a user interface 512. The control unit 502 may include a control interface 504. The control unit 502 may execute a software 510 to provide some or all of the intelligence of vehicle 100. The control unit 502 may be implemented in a number of different ways. For example, the control unit 502 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 504 may be used for communication between the control unit 502 and other functional units or devices of vehicle 100. The control interface 504 may also be used for communication that is external to the functional units or devices of vehicle 100. The control interface 504 may receive information from the functional units or devices of vehicle 100, or may transmit information to the functional units or devices of vehicle 100.

The control interface 504 may be implemented in different ways and may include different implementations depending on which functional units or devices of vehicle 100 are being interfaced with the control unit 502. For example, the control interface 504 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 504 may be connected to a communication infrastructure 522, such as a bus, to interface with the functional units or devices of vehicle 100.

The storage unit 506 may store the software 510. For illustrative purposes, the storage unit 506 is shown as a single element, although it is understood that the storage unit 506 may be a distribution of storage elements. Also for illustrative purposes, the storage unit 506 is shown as a single hierarchy storage system, although it is understood that the storage unit 506 may be in a different configuration. For example, the storage unit 506 may be formed with different storage technologies forming a memory hierarchical system including different levels of caching, main memory, rotating media, or off-line storage. The storage unit 506 may be a volatile memory, a nonvolatile memory, an internal memory, an external memory, or a combination thereof. For example, the storage unit 506 may be a nonvolatile storage such as nonvolatile random access memory (NVRAM), Flash memory, disk storage, or a volatile storage such as static random access memory (SRAM) or dynamic random access memory (DRAM).

The storage unit 506 may include a storage interface 508. The storage interface 508 may be used for communication between the storage unit 506 and other functional units or devices of vehicle 100. The storage interface 508 may also be used for communication that is external to vehicle 100. The storage interface 508 may receive information from the other functional units or devices of vehicle 100, or may transmit information to the other functional units or devices of vehicle 100. The storage interface 508 may include different implementations depending on which functional units or devices of vehicle 100 are being interfaced with the storage unit 506. The storage interface 508 may be implemented with technologies and techniques similar to the implementation of the control interface 504.

The communication unit 516 may enable communication to devices, components, modules, or units of vehicle 100. For example, the communication unit 516 may permit the vehicle 100 to communicate between the client device 122 and the cloud computing environment 110. In aspects, the communication unit 516 may include microelectronics and/ or an antenna to facilitate the communication.

The communication unit 516 may include a communication interface 518. The communication interface 518 may be used for communication between the communication unit 516 and other functional units or devices of vehicle 100. The communication interface 518 may receive information from the other functional units or devices of vehicle 100, or may transmit information to the other functional units or devices of the vehicle 100. The communication interface 518 may include different implementations depending on which functional units or devices are being interfaced with the communication unit 516. The communication interface 518 may be implemented with technologies and techniques similar to the implementation of the control interface 504.

The user interface 512 may present information generated by vehicle 100. In many aspects, the user interface 512 allows a user to interface with the devices of vehicle 100. The user interface 512 may include an input device and an output device. Examples of the input device of the user interface 512 may include a keypad, buttons, switches, touchpads, soft-keys, a keyboard, a mouse, or any combination thereof to provide data and communication inputs. Examples of the output device may include a display interface 514. The control unit 502 may operate the user interface 512 to present information generated by vehicle 100. The control unit 502 may also execute the software 510 to present information generated by vehicle 100, or to control other functional units of vehicle 100. The display interface 514 may be any graphical user interface such as a display, a projector, a video screen, or any combination thereof. For example, the display can be an infotainment or entertainment unit of vehicle 100.

It is to be appreciated that the Detailed Description section, and not the Abstract is intended to be used to interpret the claims. The Abstract section may set forth one or more but not all possible aspects of the present disclosure as contemplated by the inventor(s), and thus, are not intended to limit the subjoined claims in any way.

The foregoing disclosure outlines features of several aspects so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the aspects introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. An axle system for an electric vehicle, comprising:
a first axle assembly configured to operate in a first gear ratio, the first axle assembly comprising a first electric motor configured to drive a first axle shaft; and
a second axle assembly configured to selectively operate in a second gear ratio and a third gear ratio, the second axle assembly comprising a second electric motor configured to drive a second axle shaft,
wherein the first gear ratio, the second gear ratio, and the third gear ratio are different ratios,
wherein the first axle assembly and the second axle assembly are configured to operate independently of each other, and
wherein the first axle assembly and the second axle assembly are configured to drive the first and second axle shafts simultaneously using the first and second electric motors.

2. The axle system of claim 1, wherein the first axle assembly and the second axle assembly are configured to operate in a neutral position, independently of each other, the neutral position being a position in which the first axle shaft or the second axle shaft spins without rotating the first electric motor or the second electric motor, respectively.

3. The axle system of claim 2, wherein the first axle assembly is configured to be operated in the neutral position while the second axle assembly is operated in the second gear ratio or the third gear ratio.

4. The axle system of claim 2, wherein the second axle assembly is configured to be operated in the neutral position while the first axle assembly is operated in the first gear ratio.

5. The axle system of claim 1, wherein:
the first axle assembly and the second axle assembly are coupled to a computing system of the vehicle; and
the computing system is configured to dynamically select between the second gear ratio or the third gear ratio for operation based on sensing data.

6. The axle system of claim 5, wherein the sensing data comprises:
operating conditions including at least one of a speed of the vehicle, an acceleration of the vehicle, a deceleration of the vehicle, or a neutral gear selection; and driving conditions including at least one of a road gradient or a road surface.

7. The axle system of claim 5, wherein the first axle assembly further includes a fourth gear ratio that is different from the first, second, and third gear ratios,
wherein the computing system is configured to dynamically select between the first gear ratio, the second gear ratio, and the fourth gear ratio.

8. The axle system of claim 5, wherein the computing system is further configured to change between the second gear ratio and the third gear ratio based on the sensing data while allowing a first wheel speed output by the first axle assembly to differ from a second wheel speed output by the second axle assembly.

9. The axle system of claim 5, wherein the computing system is further configured to change between the second gear ratio and the third gear ratio based on the sensing data while matching a first wheel speed output by the first axle assembly to a second wheel speed output by the second axle assembly.

10. The axle system of claim 1, wherein the first axle assembly is configured to transfer a torque in only the first gear ratio.

11. The axle system of claim 10, wherein the second axle assembly is further configured to selectively operate in a fourth gear ratio different from the first, second, and third gear ratios.

12. An electric vehicle comprising:
a first axle assembly configured to operate in a first gear ratio, the first axle assembly comprising a first electric motor configured to drive a first axle shaft;
a second axle assembly configured to selectively operate in a second gear ratio and a third gear ratio, the second axle assembly comprising a second electric motor configured to drive a second axle shaft; and
a computing system configured to:
control the first axle assembly and the second axle assembly, and
dynamically select between the second gear ratio and the third gear ratio,
wherein the first gear ratio, the second gear ratio, and the third gear ratio are different ratios,
wherein the first axle assembly and the second axle assembly are configured to operate independently of each other, and
wherein the first axle assembly and the second axle assembly are configured to drive the first and second axle shafts simultaneously using the first and second electric motors.

13. The vehicle of claim 12, wherein the first axle assembly and the second axle assembly are configured to operate in a neutral position, independently of each other, the neutral position being a position in which the first axle shaft or the second axle shaft spins without rotating the first electric motor or the second electric motor, respectively.

14. The vehicle of claim 13, wherein the first axle assembly is configured to be operated in the neutral position while the second axle assembly is operated in the second gear ratio or the third gear ratio.

15. The vehicle of claim 13, wherein the second axle assembly is configured to be operated in the neutral position while the first axle assembly is operated in the first gear ratio.

16. The vehicle of claim 12, wherein the computing system is configured to dynamically select the second gear ratio or the third gear ratio for operation based on sensing data of the vehicle.

17. The vehicle of claim 16, wherein the sensing data comprises:

operating conditions including at least one of a speed of the vehicle, an acceleration of the vehicle, a deceleration of the vehicle, or a neutral gear selection; and driving conditions including at least one of a road gradient or a road surface.

18. A computing system for an electric vehicle comprising:

a memory storing instructions; and one or more processors, coupled to the memory, and configured to dynamically select a first gear ratio and a second gear ratio of a first axle assembly of the vehicle, the first axle assembly comprising a first electric motor configured to drive a first axle shaft, wherein a second axle assembly of the vehicle has a third gear ratio, the second axle assembly comprising a second electric motor configured to drive a second axle shaft, wherein the first gear ratio, the second gear ratio, and the third gear ratio are different ratios, wherein the one or more processors are further configured to control the first axle assembly and the second axle assembly independently of each other, and wherein the one or more processers are further configured to operate the first and second motors such that they drive the first and second axle shafts simultaneously.

19. The computing system of claim 18, wherein the one or more processors are further configured to set the first axle assembly and the second axle assembly in a neutral position, independently of each other, the neutral position being a position in which the first axle shaft or the second axle shaft spins without rotating the first electric motor or the second electric motor, respectively.

20. The computing system of claim 19, wherein the first axle assembly is configured to be operated in the neutral position while the second axle assembly is operated in the third gear ratio.

21. The computing system of claim 19, wherein the second axle assembly is configured to be operated in the neutral position while the first axle assembly is operated in the first gear ratio or the second gear ratio.

22. The computing system of claim 18, wherein the one or more processors are further configured to select between the first gear ratio or the second gear ratio for operation based on sensing data.

23. The computing system of claim 22, wherein the sensing data includes:

operating conditions including at least one of a speed of the vehicle, an acceleration of the vehicle, a deceleration of the vehicle, or a neutral gear selection; and driving conditions including at least one of a road gradient or a road surface.

* * * * *